US008625843B2

(12) United States Patent
Oosawa

(10) Patent No.: US 8,625,843 B2
(45) Date of Patent: Jan. 7, 2014

(54) MONITORING SYSTEM, IMAGE-PROCESSING APPARATUS, MANAGEMENT APPARATUS, EVENT DETECTING METHOD, AND PROGRAM

(75) Inventor: Katsumi Oosawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 981 days.

(21) Appl. No.: 11/501,372

(22) Filed: Aug. 9, 2006

(65) Prior Publication Data
US 2007/0036515 A1 Feb. 15, 2007

(30) Foreign Application Priority Data

Aug. 11, 2005 (JP) ................ P2005-233073

(51) Int. Cl.
*G06K 9/00* (2006.01)
*H04N 7/26* (2006.01)

(52) U.S. Cl.
USPC ........... 382/103; 348/152; 348/153; 348/154; 348/159

(58) Field of Classification Search
USPC .................. 382/103; 348/152, 153, 154, 159
See application file for complete search history.

(56) References Cited

U.S. PATENT DOCUMENTS

| | | | | |
|---|---|---|---|---|
| 5,594,504 | A * | 1/1997 | Ebrahimi | 375/240.16 |
| 6,441,734 | B1 * | 8/2002 | Gutta et al. | 340/541 |
| 6,678,417 | B1 * | 1/2004 | Baumgartner et al. | 382/236 |
| 7,177,448 | B1 * | 2/2007 | Sah | 382/107 |
| 7,346,188 | B2 * | 3/2008 | Aichi | 382/103 |
| 7,463,145 | B2 * | 12/2008 | Jentoft | 340/541 |
| 7,525,571 | B2 * | 4/2009 | Ando et al. | 348/207.1 |
| 7,623,152 | B1 * | 11/2009 | Kaplinsky | 348/208.16 |
| 2002/0054211 | A1 * | 5/2002 | Edelson et al. | 348/169 |
| 2002/0163577 | A1 | 11/2002 | Myers | |
| 2002/0171734 | A1 * | 11/2002 | Arakawa et al. | 348/143 |
| 2003/0062997 | A1 | 4/2003 | Naidoo et al. | |
| 2004/0148518 | A1 * | 7/2004 | Grundback et al. | 713/201 |

(Continued)

FOREIGN PATENT DOCUMENTS

| | | |
|---|---|---|
| JP | 6-105312 | 4/1994 |
| JP | 2002-44645 | 2/2002 |

(Continued)

OTHER PUBLICATIONS

Chung, et al. "Efficient Block-based Motion Segmentation Method using Motion Vector Consistency." MVA2005 IAPR Conference on Machine Vision Applications. (2005): 550-553. Print.*
Japanese Office Action dated Oct. 13, 2009.

*Primary Examiner* — Michael A Newman
(74) *Attorney, Agent, or Firm* — Frommer Lawrence & Haug LLP; William S. Frommer; Ellen Marcie Emas

(57) ABSTRACT

A monitoring system includes a plurality of image-capturing apparatuses each including an event detector that executes on a corresponding captured image at least one of a plurality of processing algorithms for detection of a monitor event, and a transmission controller that outputs to a network only a processing result of the executed processing algorithm when a monitor event is not detected and that outputs to the network at least the captured image when a monitor event is detected; and a management apparatus managing the plurality of image-capturing apparatuses via the network and including an event determination unit that determines occurrence of a monitor event in accordance with the received processing result and a record controller that records the received captured image.

12 Claims, 17 Drawing Sheets

(56) References Cited

U.S. PATENT DOCUMENTS

| | | | |
|---|---|---|---|
| 2004/0184529 A1* | 9/2004 | Henocq et al. | 375/240.01 |
| 2004/0240542 A1* | 12/2004 | Yeredor et al. | 375/240.01 |
| 2005/0057653 A1 | 3/2005 | Maruya | |
| 2006/0095539 A1* | 5/2006 | Renkis | 709/217 |
| 2007/0039030 A1* | 2/2007 | Romanowich et al. | 725/105 |

FOREIGN PATENT DOCUMENTS

| | | |
|---|---|---|
| JP | A 2004-056655 | 2/2004 |
| JP | A 2004-186844 | 2/2004 |
| JP | 2005-39693 | 2/2005 |
| JP | 2005-118927 | 5/2005 |
| WO | WO 0072573 A2 * | 11/2000 |

* cited by examiner

MOTION DETECTION

REGION INTEGRATION

LABELING

REGION DETERMINATION

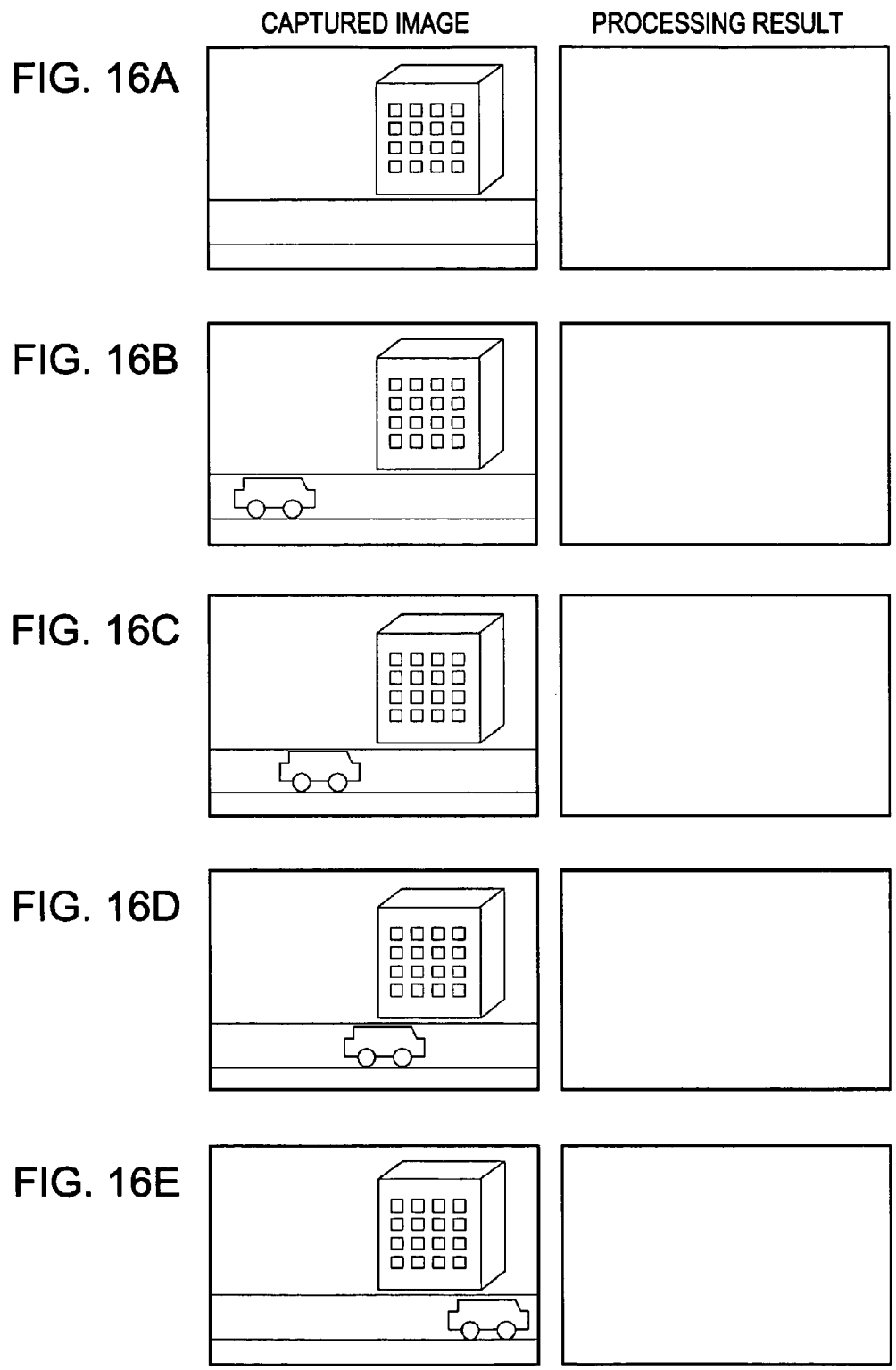

| | CAPTURED IMAGE | PROCESSING RESULT |
|---|---|---|
| FIG. 17A | 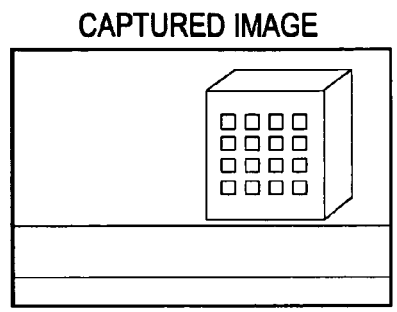 |  |
| FIG. 17B | 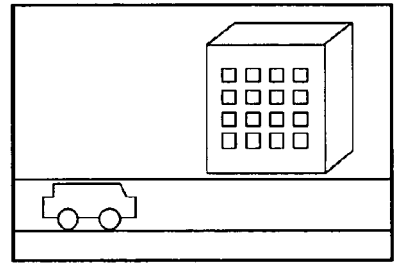 | 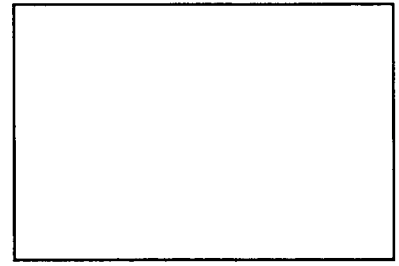 |
| FIG. 17C | 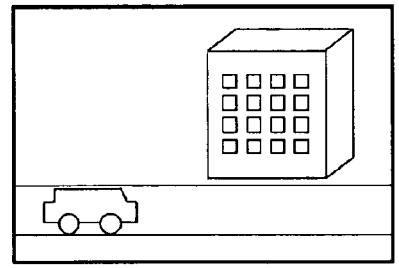 | 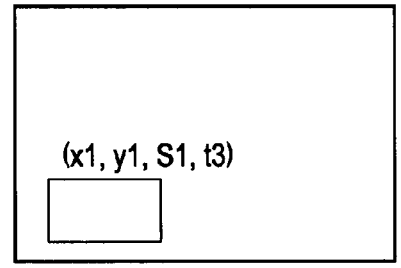 |
| FIG. 17D | 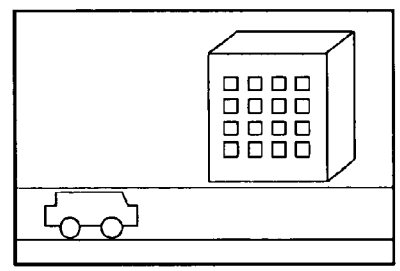 | 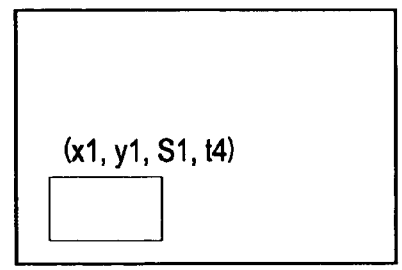 |
| FIG. 17E | 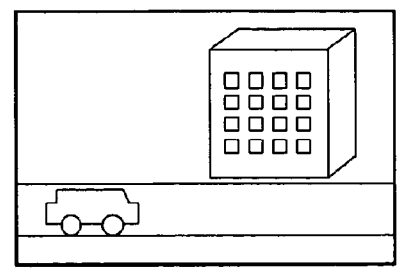 | 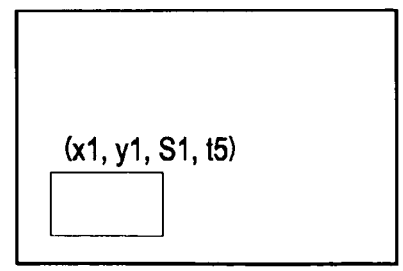 |

MONITORING SYSTEM, IMAGE-PROCESSING APPARATUS, MANAGEMENT APPARATUS, EVENT DETECTING METHOD, AND PROGRAM

CROSS REFERENCES TO RELATED APPLICATIONS

The present invention contains subject matter related to Japanese Patent Application JP 2005-233073 filed in the Japanese Patent Office on Aug. 11, 2005, the entire contents of which are incorporated herein by reference.

BACKGROUND OF THE INVENTION

1. Field of the Invention

The present invention relates to a system that detects occurrence of a monitor event within an image capture range and to an event detecting method. The present invention also relates to an image-processing apparatus disposed on an image capture side in a monitoring system. The present invention also relates to a management apparatus that records a captured image in accordance with occurrence of a monitor event within a system in the monitoring system. The present invention also relates to a program for realizing functions of the image-processing apparatus and the management apparatus.

2. Description of the Related Art

Currently, monitoring systems are used in various fields, such as in the establishment of security systems.

FIG. 1 shows an example of a known structure of a security system. Referring to FIG. 1, the security system includes an image-capturing camera 1 and a management apparatus 3 managing the image-capturing camera 1. In the example shown in FIG. 1, a display device 5 is externally connected to the management apparatus 3.

Moving body detection is a typical function of security systems. Moving body detection is a function of detecting intrusion of a moving body, such as a human being or a vehicle, into an image capture range. In general, when a moving body is detected, an alert is sent out and a captured image is recorded.

In known security systems, the image-capturing camera 1 is provided with only a function of distributing a captured image, and the management apparatus 3 performs a moving body detection process.

For example, the image-capturing camera 1 shown in FIG. 1 includes an image-capturing element 11, a camera signal processor 13, a central processing unit (CPU) 15, an image compressor 17, and a network processor 19. The camera signal processor 13 is a processing device that performs signal amplification processing, analog/digital conversion processing, exposure control processing, and other processing necessary for converting a captured image into a video signal. The image compressor 17 is a processing device that compresses and encodes a captured image in, for example, a joint photographic experts group (JPEG) format or a moving picture experts group (MPEG) format.

The management apparatus 3 includes a network processor 31, a CPU 33, a display controller 35, an image decompressor 37, an event detector 39, a disk controller 41, and a hard disk device 43. The event detector 39 is a processing device that detects intrusion of a moving body using image processing of a captured image received via a network. The network is based on the communication standard defined by, for example, the IEEE 802.3 standard.

FIG. 2 shows an example of function allocation of processing algorithms for moving body detection. Referring to FIG. 2, the image-capturing camera 1 performs processing from image capture to transfer of a captured image to a network. The management apparatus 3 performs a series of processes from motion detection to alert execution.

A known technology is described, for example, in Japanese Unexamined Patent Application Publication No. 2003-233889.

SUMMARY OF THE INVENTION

As described above, in existing security systems, a management apparatus performs a moving body detection process. Thus, it is necessary for an image-capturing camera to distribute captured image data.

Parts (a) and (b) of FIG. 3 show examples of use of network bandwidth. Part (a) of FIG. 3 shows an example of use of bandwidth during a period (normal period) in which intrusion of a moving body is not detected. Part (b) of FIG. 3 shows an example of use of bandwidth during a period (alert period) after intrusion of a moving body is detected. As is clear from parts (a) and (b) of FIG. 3, in existing security systems, a constant amount (in this example, 3 Mbps) of network bandwidth is occupied, irrespective of intrusion or non-intrusion of a moving body.

Moreover, as shown in FIG. 4, if the number of image-capturing cameras 1 managed by the management apparatus 3 increases, the occupied bandwidth of a network increases. For example, if the management apparatus 3 manages four image-capturing cameras 1, a bandwidth of 12 Mbps (=3 Mbps×4) is normally occupied. Thus, when the number of image-capturing cameras 1 managed by the management apparatus 3 increases, an increase in the occupied bandwidth of a network becomes an issue.

In addition, when the number of image-capturing cameras 1 that have stopped their operations increases, the management apparatus 3 performs a moving body detection process in a concentrated manner. Thus, as the number of image-capturing cameras 1 managed by the management apparatus 3 increases, a higher processing ability is necessary for the management apparatus 3. For example, when the management apparatus 3 manages four image-capturing cameras 1, processing ability similar to that of a Pentium® 3 GHz processor is necessary for realizing a moving body detection process that is suitable for practical use in terms of the current level of technology.

In addition, in order to establish a large-scale security system managing many image-capturing cameras, it is necessary to increase the number of management apparatuses 3 in proportion to an increase in the number of image-capturing cameras 1 to be managed by the management apparatuses 3.

FIG. 5 shows an example of establishment of a large-scale security system. In the example shown in FIG. 5, four management apparatuses 3 manage sixteen image-capturing cameras 1 and a system server 7 hierarchically manages the four management apparatuses 3.

FIG. 6 shows the relationship between the number of image-capturing cameras 1 and the necessary number of management apparatuses 3. Referring to FIG. 6, the number of management apparatuses 3 increases in proportion to an increase in the number of image-capturing cameras 1.

Accordingly, a monitoring system according to an embodiment of the present invention includes a plurality of image-capturing apparatuses each including an event detector that executes on a corresponding captured image at least one of a plurality of processing algorithms for detection of a monitor event, and a transmission controller that outputs to a network only a processing result of the executed processing algorithm when a monitor event is not detected and that outputs to the network at least the captured image when a monitor event is detected; and a management apparatus managing the plurality of image-capturing apparatuses via the network and including an event determination unit that determines occurrence of a monitor event in accordance with the received processing result and a record controller that records the received captured image.

A monitoring system according to another embodiment of the present invention includes a plurality of image-capturing apparatuses; a plurality of image-processing apparatuses each including an event detector that executes on a corresponding captured image at least one of a plurality of processing algorithms for detection of a monitor event, and a transmission controller that outputs to a network only a processing result of the executed processing algorithm when a monitor event is not detected and that outputs to the network at least the captured image when a monitor event is detected; and a management apparatus managing the plurality of image-processing apparatuses via the network and including an event determination unit that determines occurrence of a monitor event in accordance with the received processing result and a record controller that records the received captured image.

In the monitoring system according to any one of the foregoing embodiments, the image capture side executes at least one of a plurality of processing algorithms for detection of a monitor event. In a normal state, only a processing result is transmitted to a network. Only when a monitor event occurs, a captured image is transmitted to the network.

Thus, the occupied bandwidth of the network is reduced, and network resources can be effectively utilized.

In addition, since the processing load of a management apparatus managing a plurality of image capture side apparatuses (including image-capturing apparatuses and image-prbcessing apparatuses) is reduced, a large-scale system managing many image capture side apparatuses can be established using a smaller number of management apparatuses, compared with known systems.

BRIEF DESCRIPTION OF THE DRAWINGS

FIGS. 16A to 16E show processing results when a moving body makes intrusion; and FIGS. 17A to 17E show processing results when a non-moving body makes intrusion.

DESCRIPTION OF THE PREFERRED EMBODIMENTS

Embodiments of the present invention will be described.

Well-known technologies in the technical field of the present invention are applied to portions not illustrated or described in this specification.

The embodiments given below are merely examples, and the present invention is not limited to the embodiments.

First Embodiment

Figure 1:
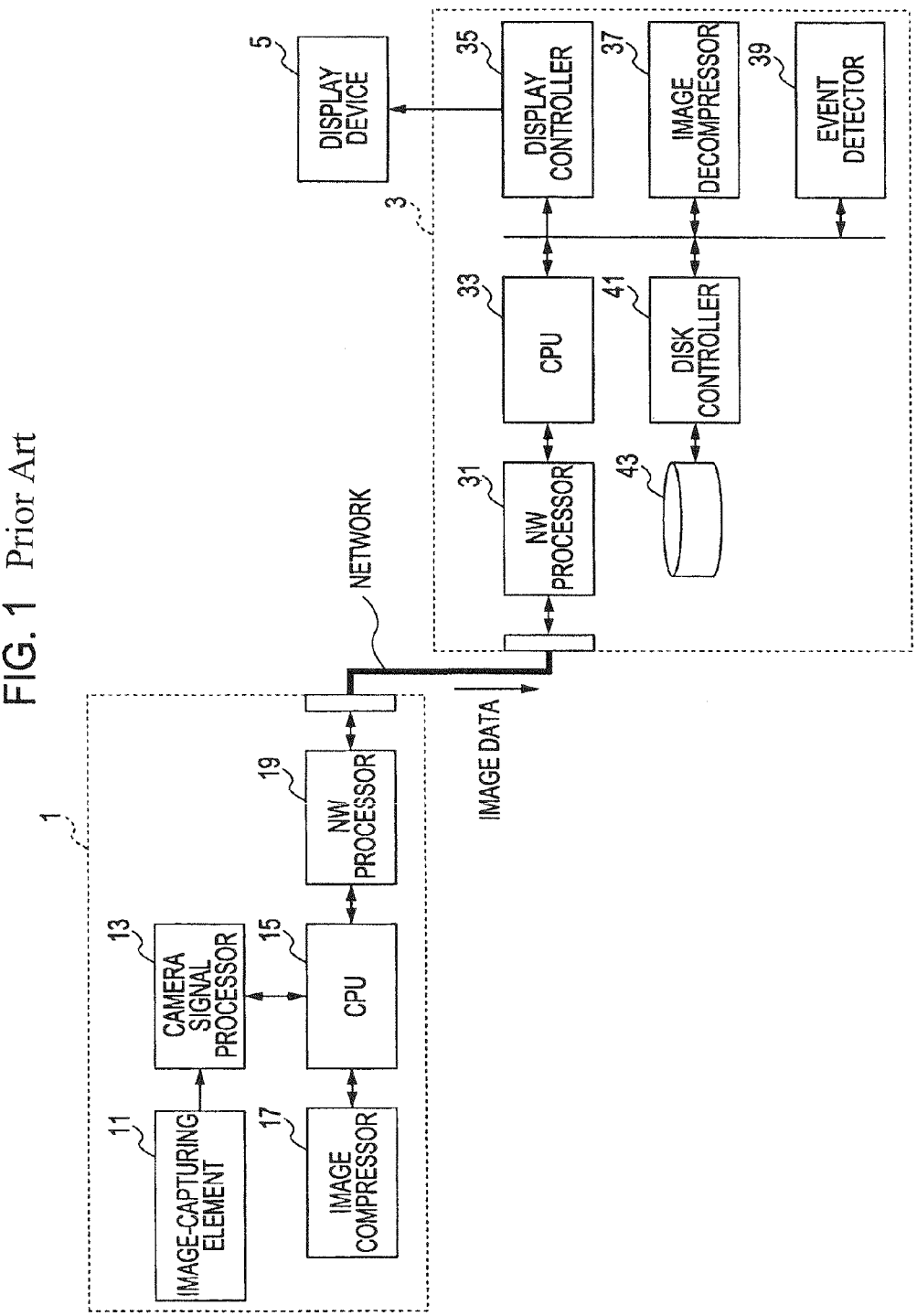
FIG. 1 shows an example of a known configuration of a security system.
Figure 2:
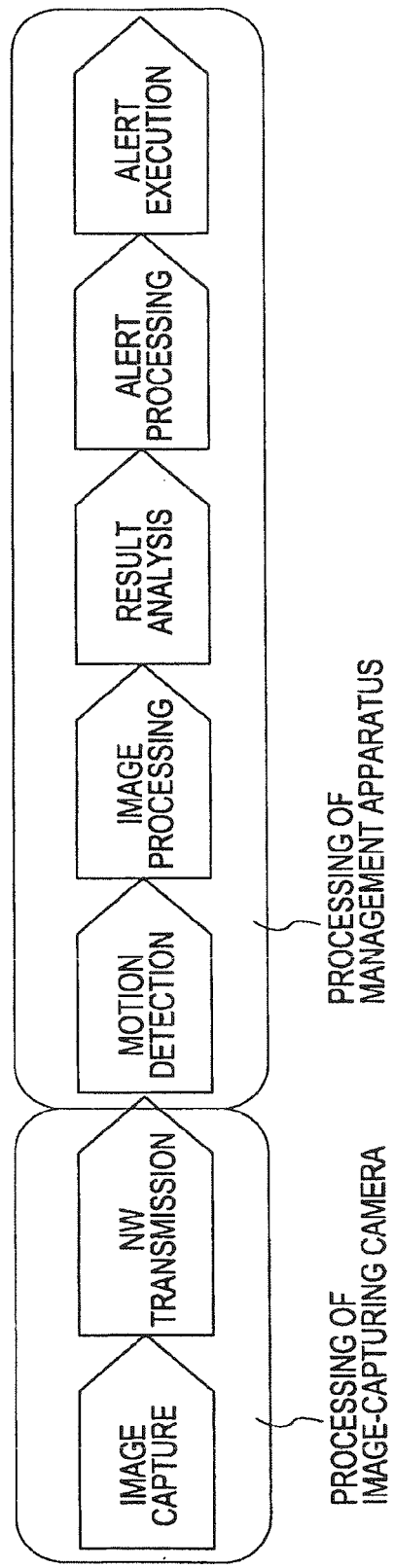
FIG. 2 shows an example of functional allocation for an image-capturing apparatus and a management apparatus according to a known technology.
Figure 3:
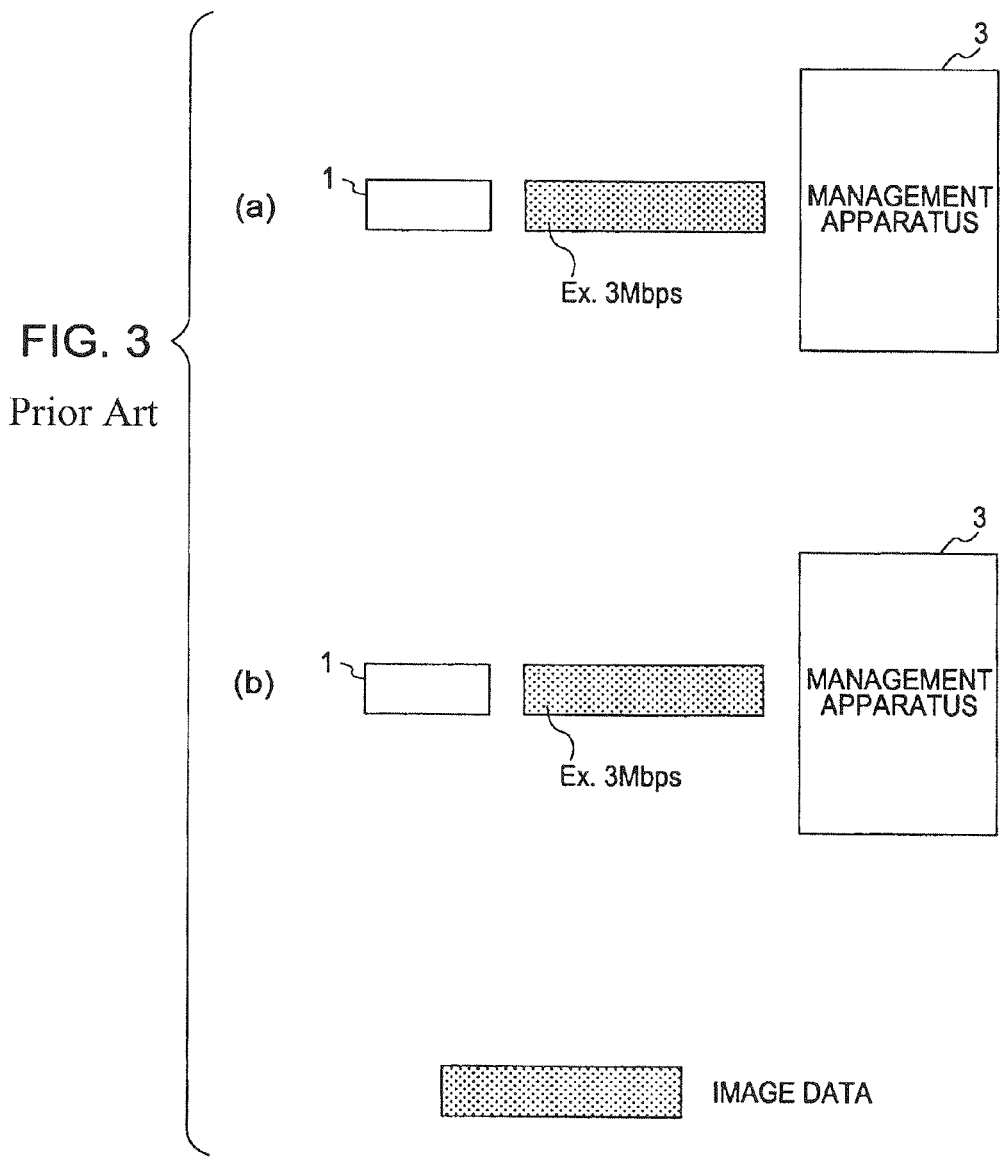
FIG. 3 shows an example of use of network bandwidth according to the known technology.
Figure 4:
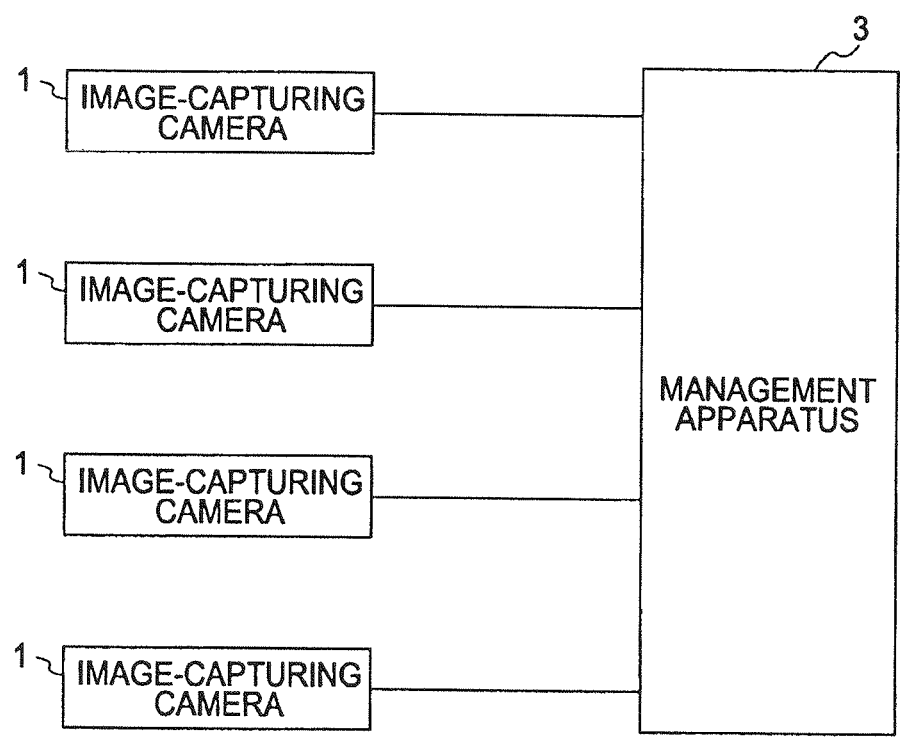
FIG. 4 shows an example in which an apparatus manages image-capturing cameras according to the known technology.
Figure 5:
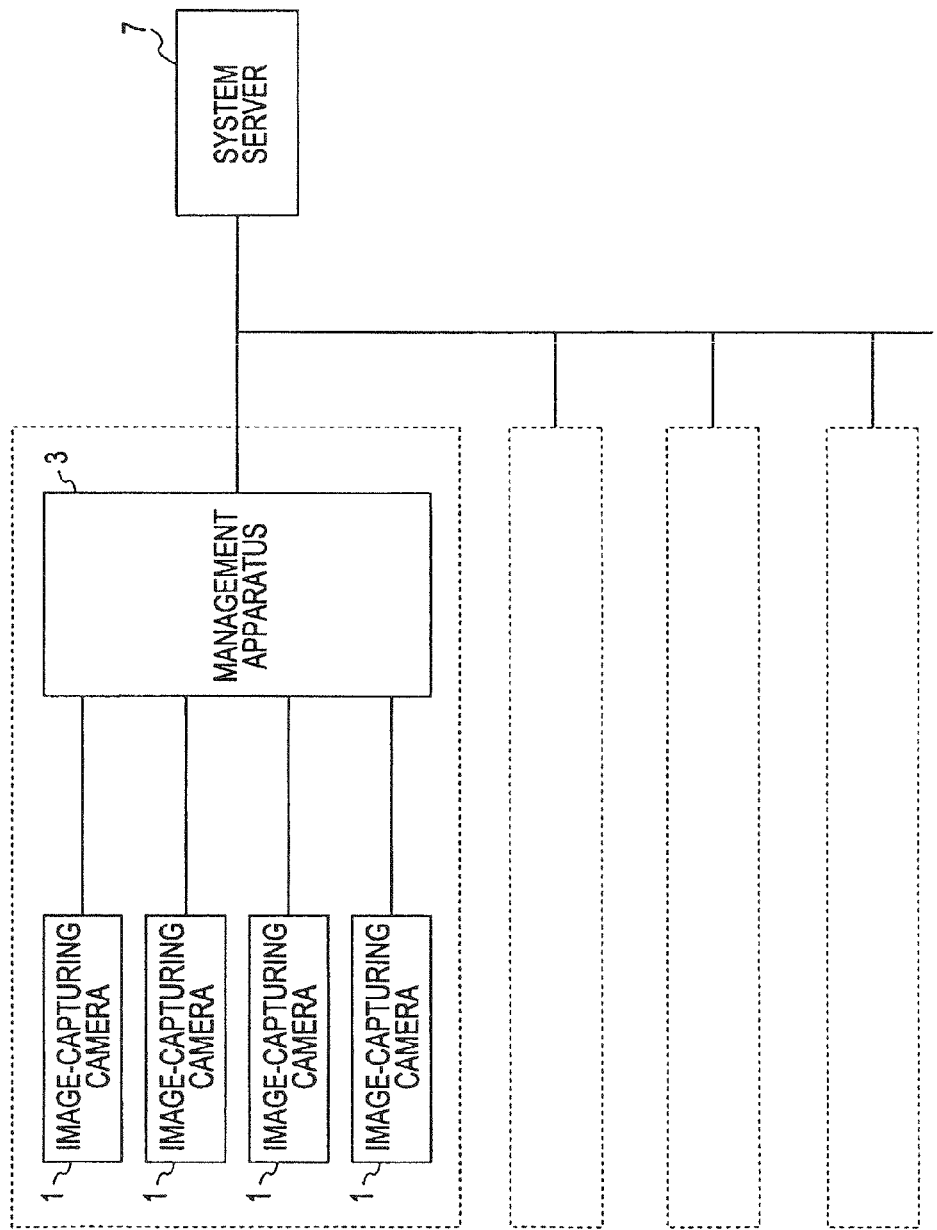
FIG. 5 shows an example of a system according to the known technology in which many image-capturing cameras are managed.
Figure 6:
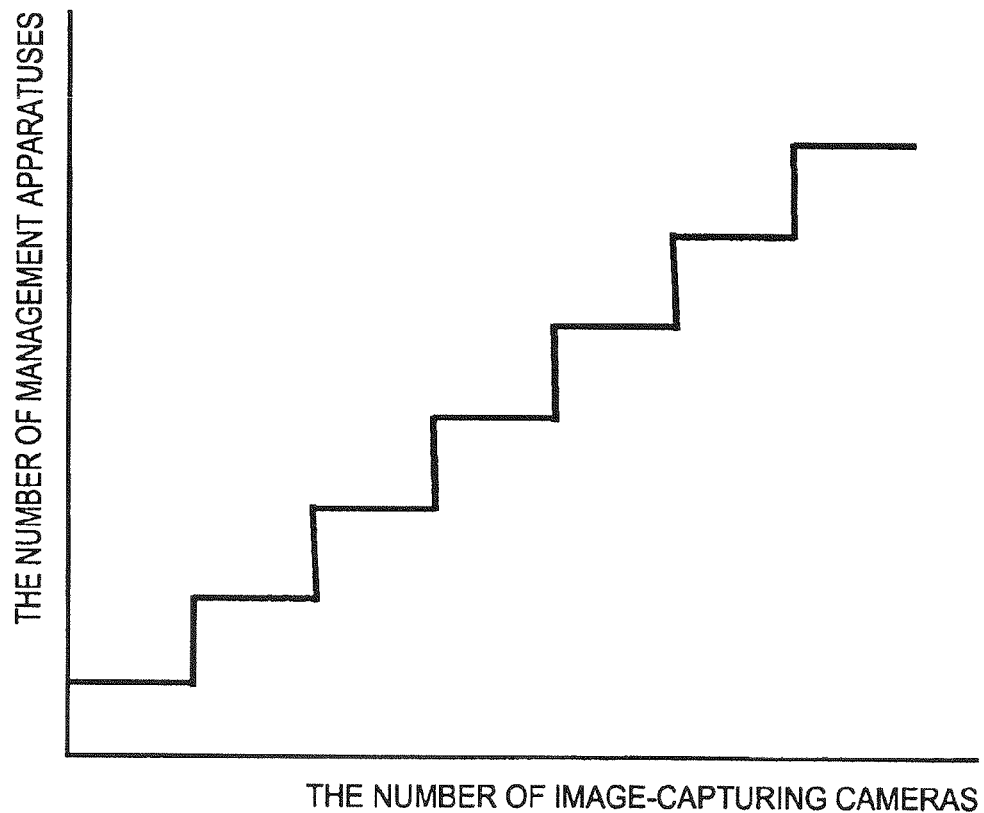
FIG. 6 shows the relationship between the number of image-capturing cameras and the necessary number of management apparatuses when a system is configured using known apparatuses.
Figure 7:
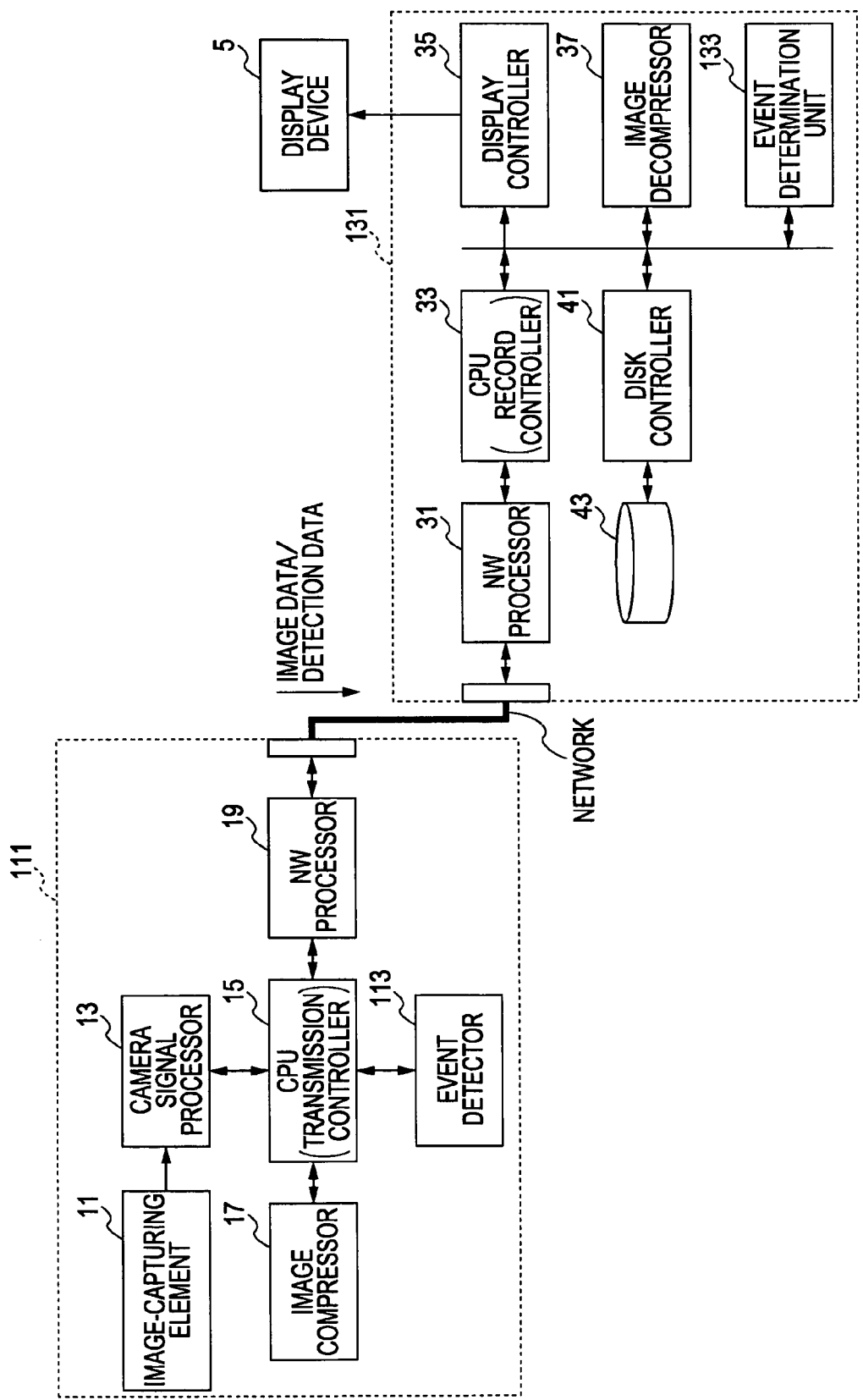
FIG. 7 shows a security system according to an embodiment of the present invention.

FIG. 7 shows an example of the configuration of a monitoring system when applied to a security system. In FIG. 7, parts corresponding to parts in FIG. 1 are referred to with the same reference numerals.

The security system includes an image-capturing camera 111 and a management apparatus 131 that manages the image-capturing camera 111. A display device 5 is externally connected to the management apparatus 131.

The image-capturing camera 111 includes an image-capturing element 11, a camera signal processor 13, a CPU 15, an image compressor 17, a network processor 19, and an event detector 113.

The image-capturing element 11 includes a solid-state image-capturing element, such as a charge-coupled device (CCD) sensor or a complementary metal-oxide semiconductor (CMOS) sensor. The camera signal processor 13 is a processing device that performs signal amplification processing, analog/digital conversion processing, exposure control processing, and other processing necessary for converting a captured image into a video signal.

The CPU 15 is a control device that controls processing operations of the entire image-capturing camera 111. For example, the CPU 15 includes a microprocessor. The CPU 15 also functions as a transmission controller that selects data to be output to a network.

The image compressor 17 is a processing device that compresses and encodes a captured image to be output to the network.

The network processor 19 is a communication device that performs data transmission and reception via the network.

The event detector 113 is a processing device that performs image processing on image data captured by the image-capturing element 11 and that detects occurrence of a monitor event. A process for detecting a monitor event is achieved by performing a plurality of processing steps in accordance with a detection purpose and a processing detail.

Figure 8A:
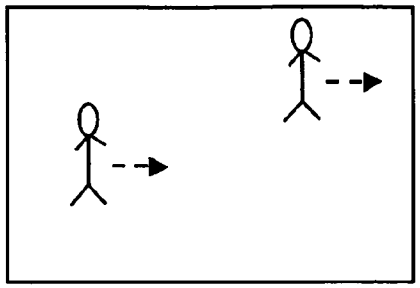
FIGS. 8A to 8E show an example of processing steps when intrusion of a moving body is detected.
Figure 8B:
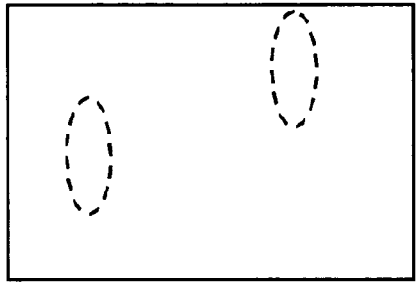
Figure 8C:
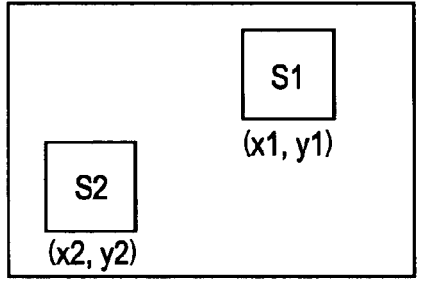
Figure 8D:
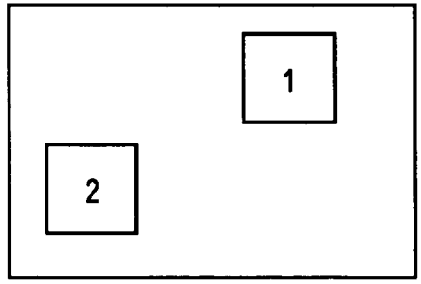
Figure 8E:
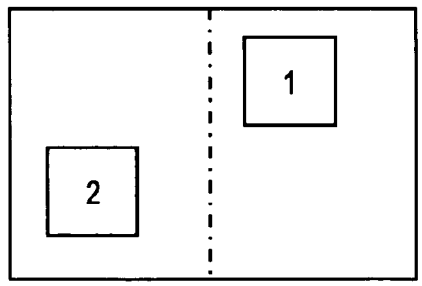

FIGS. 8A to 8E show an example of processing steps when a monitor event indicates intrusion of a moving body into a set area. In this case, the detection process includes motion detection processing (FIG. 8B), region integration processing (FIG. 8C), labeling processing (FIG. 8D), and region determination processing (FIG. 8E).

In the motion detection processing, motion vectors in a captured image (FIG. 8A) are detected.

In the region integration processing, regions including detected motion vectors are integrated together for each moving body. In this processing, a size S and coordinates (x,y) of each integrated region are acquired.

In the labeling processing, a label is provided to each integrated region.

In the region determination processing, it is determined where on the screen each region provided with a label is located.

By performing the above-described processing, intrusion or non-intrusion of a moving body and the position into which the moving body intrudes can be acquired.

In this embodiment, when intrusion of a moving body is detected, the CPU 15, which serves as the transmission controller, gives an instruction to output to the network a captured image and a processing result acquired by the moving body detection process. In contrast, when intrusion of a moving body is not detected, the CPU 15, which serves as the transmission controller, gives an instruction to output to the network only a processing result acquired by the moving body detection process. That is, the CPU 15 transmits a captured image only in a case where a captured image to be recorded is generated. In other cases, the CPU 15 transmits only the current detection result.

In contrast, the management apparatus 131 includes a network processor 31, a CPU 33, a display controller 35, an image decompressor 37, a disk controller 41, a hard disk device 43, and an event determination unit 133.

The network processor 31 is a communication device that performs data transmission and reception via the network.

The CPU 33 is a control device that controls processing operations of the entire management apparatus 131. For example, the CPU 33 includes a microprocessor. The CPU 33 also functions as a record controller that gives an instruction to record to the hard disk device 43 a captured image received via the network.

The display controller 35 is a data processor that outputs to the display device 5 security conditions and a captured image received from the containing image-capturing camera 111.

The image decompressor 37 is a decoder that releases compression and encoding processing on a captured image in order to recover the original image.

The disk controller 41 is a controller that controls the hard disk device 43 to record and play back data including a captured image.

The event determination unit 133 is a processing device that determines whether or not a monitor event received via the network occurs. The event determination unit 133 performs the processing on a processing result acquired by the moving body detection process. Thus, even if the management apparatus 131 manages many image-capturing cameras 111, the event determination unit 133 handles only a small processing load. In this embodiment, the event determination unit 133 sends out an alert when a moving body makes intrusion.

Figure 9:
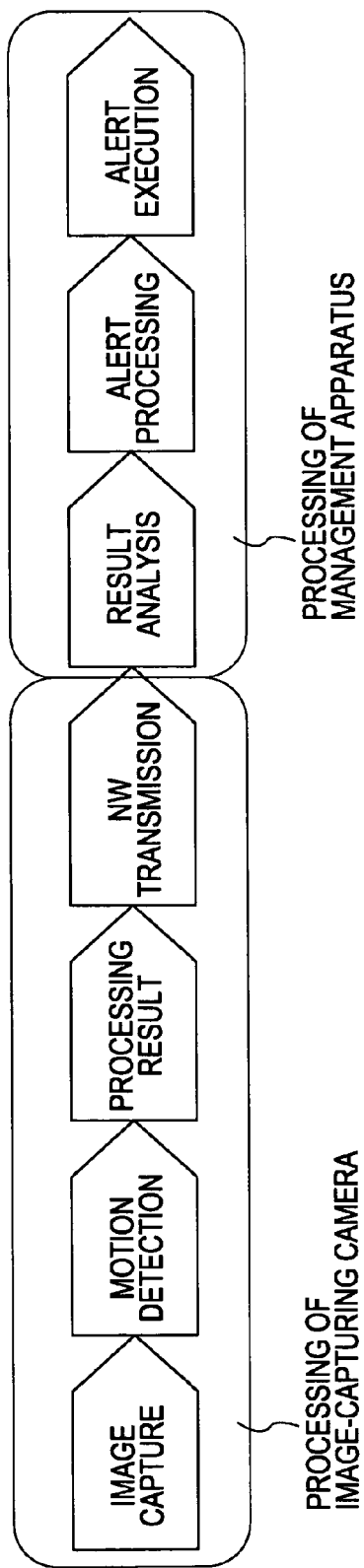
FIG. 9 shows an example of functional allocation for an image-capturing apparatus and a management apparatus according to the embodiment.

FIG. 9 shows an example of function allocation of processing algorithms for moving body detection. Referring to FIG. 9, the image-capturing camera 111 performs processing from image capture to transfer of a motion detection result (processing result) to a network. The management apparatus 131 performs a series of processes from determination of the received processing result to alert execution.

Thus, since the image-capturing camera 111 performs the motion detection processing, this security system is capable of minimizing the occupied bandwidth during a normal period.

Figure 10:
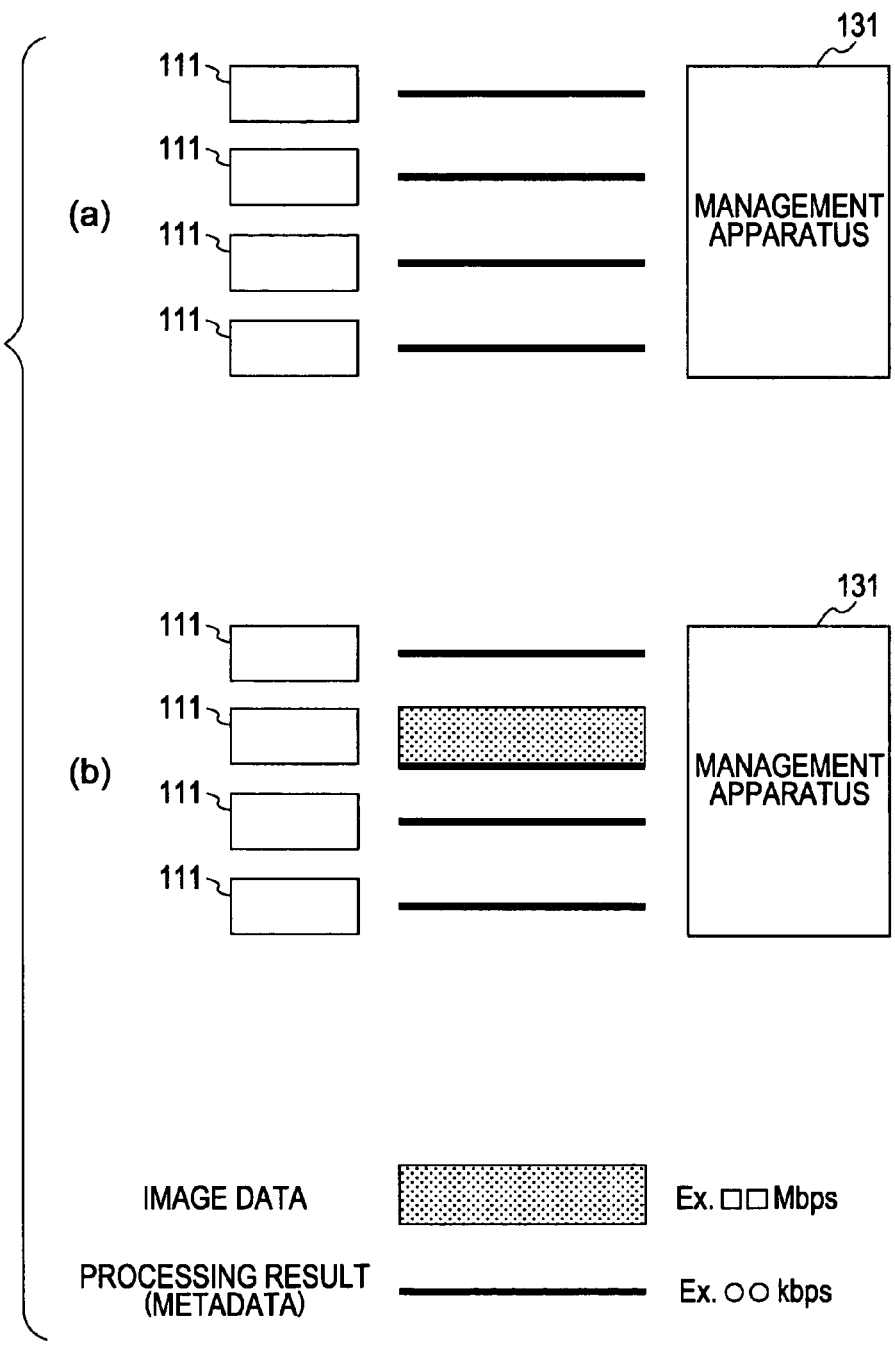
FIG. 10 shows an example of use of network bandwidth according to the embodiment.
Figure 11:
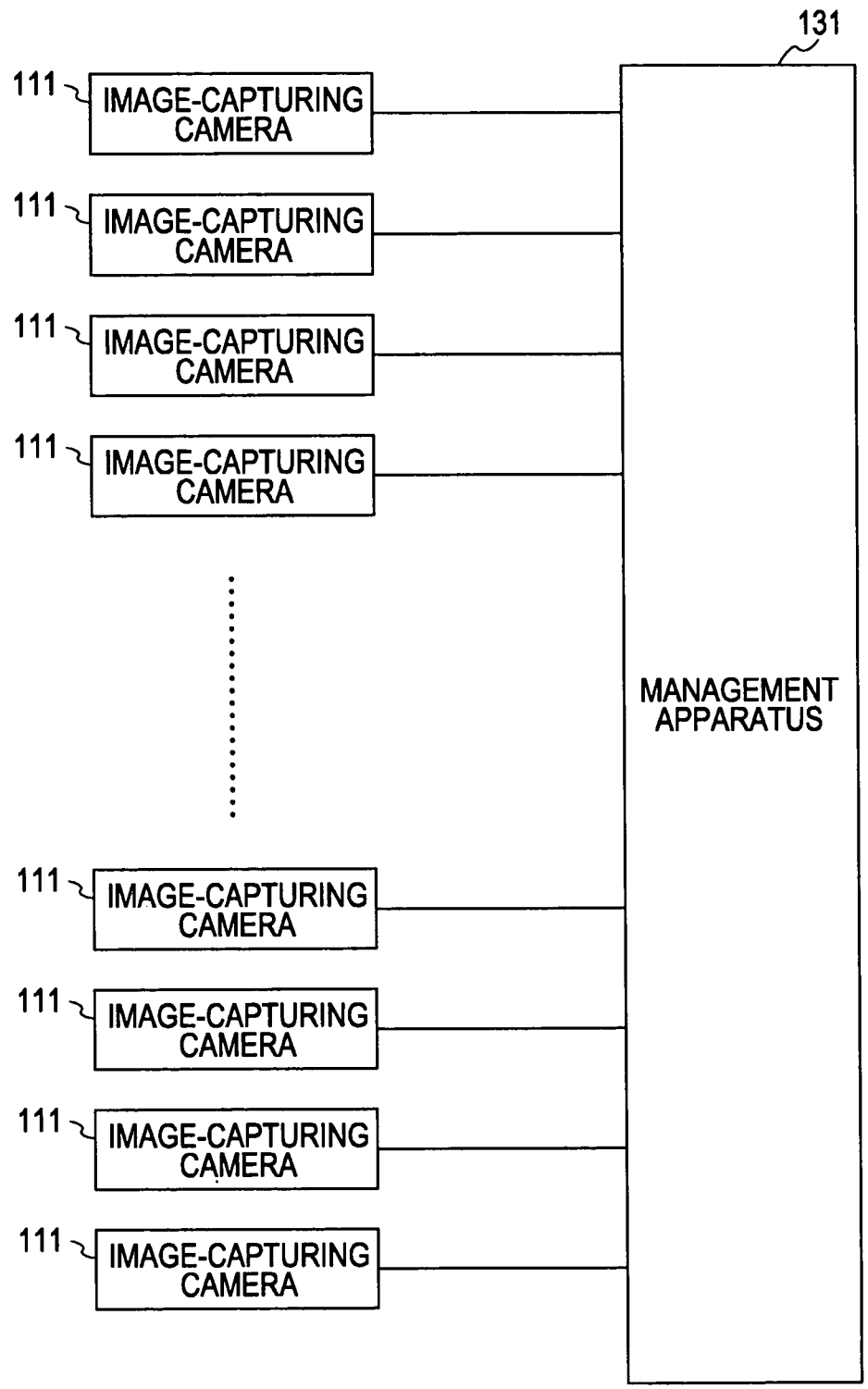
FIG. 11 shows an example of the system according to the embodiment when many image-capturing cameras are managed.

Parts (a) and (b) of FIG. 10 show examples of use of network bandwidth. Part (a) of FIG. 10 shows an example of use of bandwidth during a period (normal period) in which intrusion of a moving body is not detected. Part (b) of FIG. 10 shows an example of use of bandwidth during a period (alert period) after intrusion of a moving body is detected.

As shown in parts (a) and (b) of FIG. 10, in the security system shown in FIG. 7, during a period in which intrusion of a moving body is not detected, the occupied bandwidth can be reduced to about several kbps even if the management apparatus 131 manages four image-capturing cameras 111. In addition, in any cases other than a case where all the four image-capturing cameras 111 detect intrusion of moving bodies, the occupied bandwidth of the network can be reduced compared with a case where an existing security system is used.

Moreover, since the processing load of the management apparatus 131 can be dramatically reduced, the single management apparatus 131 is capable of managing many image-capturing cameras 111. Thus, an increase or decrease in the number of image-capturing cameras can be easily achieved. Therefore, a system can be flexibly changed even after system operation.

Figure 12:
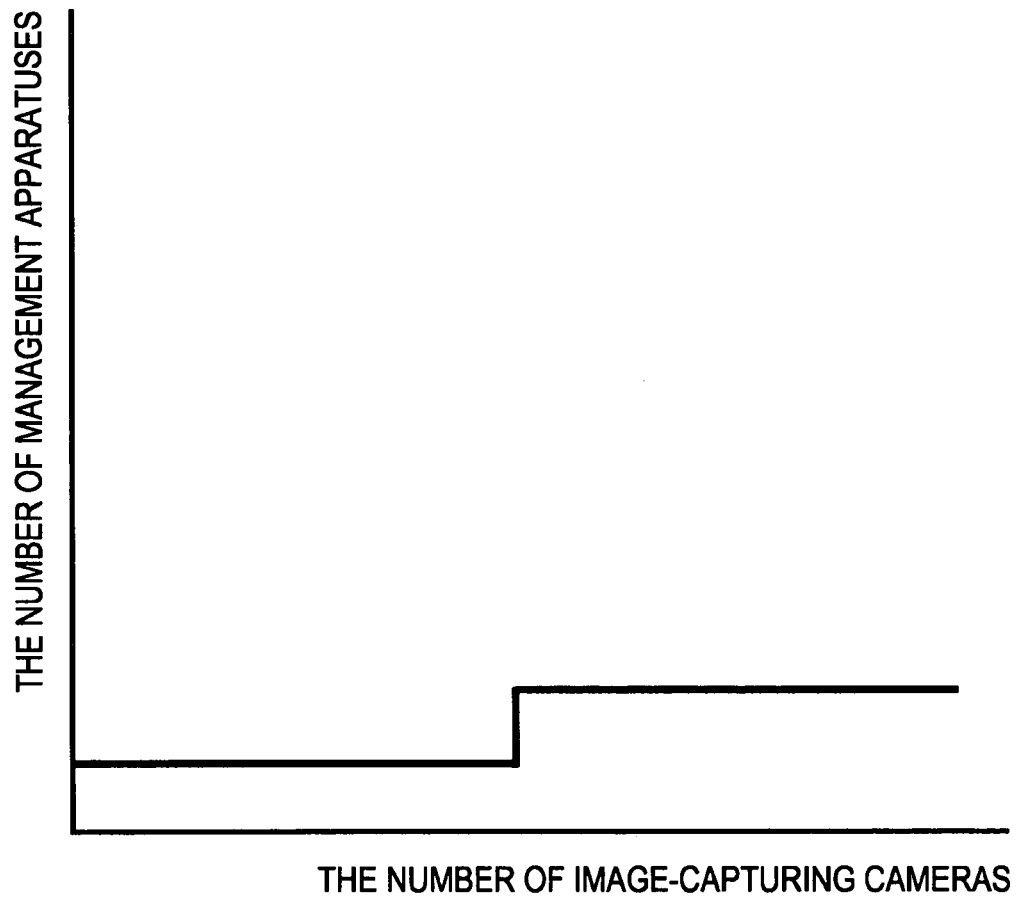
FIG. 12 shows the relationship between the number of image-capturing cameras and the necessary number of management apparatuses when the system is configured using the apparatuses according to the embodiment.

FIG. 12 shows the relationship between the number of image-capturing cameras 111 and the necessary number of management apparatuses 131. As shown in FIG. 12, an increase in the number of the management apparatuses 131 can be suppressed with respect to an increase in the number of the image-capturing cameras 111.

Other Embodiments

In the first embodiment, a case where the image-capturing camera 111 includes the event detector 113 is described. That is, a configuration of a product in which the event detector 113 is mounted or installed in the image-capturing camera 111 is described.

However, the configuration of an apparatus on an image capture side is not limited to this. For example, the event detector 113 may be installed in an image-processing apparatus that is independent of an image-capturing apparatus. In this case, the image-processing apparatus is provided with a function of communicating with the network.

Figure 13:
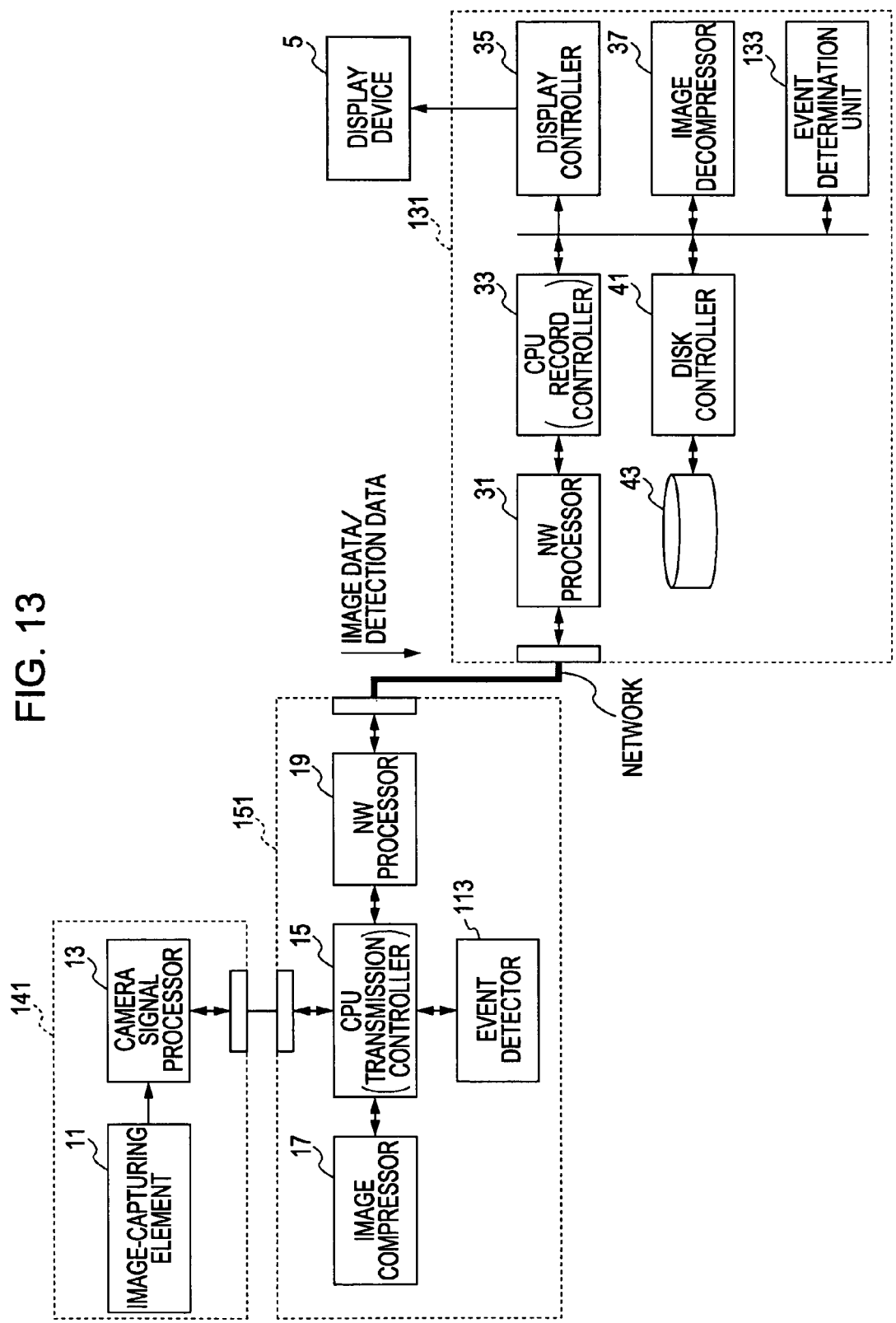
FIG. 13 shows an example of a security system according to another embodiment of the present invention.

FIG. 13 shows another example of the configuration of the monitoring system. In FIG. 13, parts corresponding to parts in FIG. 7 are referred to with the same reference numerals.

The monitoring system shown in FIG. 13 includes an image-capturing camera 141, an image-processing apparatus 151, and a management apparatus 131. Since each device within the apparatuses is similar to that in the first embodiment, the description of the device will be omitted. In this system configuration, since a captured image (image data) is distributed on the network only when a moving body is detected, advantages similar to those in the first embodiment can be achieved.

Although the configuration of an image-capturing camera is described in the foregoing embodiments, the monitoring system can be established using an image-processing apparatus 161 of any type having a function other than the image-capturing function.

For example, the monitoring system can be established using a portable information terminal, such as a cellular phone or a mobile information terminal, or a robot, such as a humanoid robot or animal robot.

Figure 14:
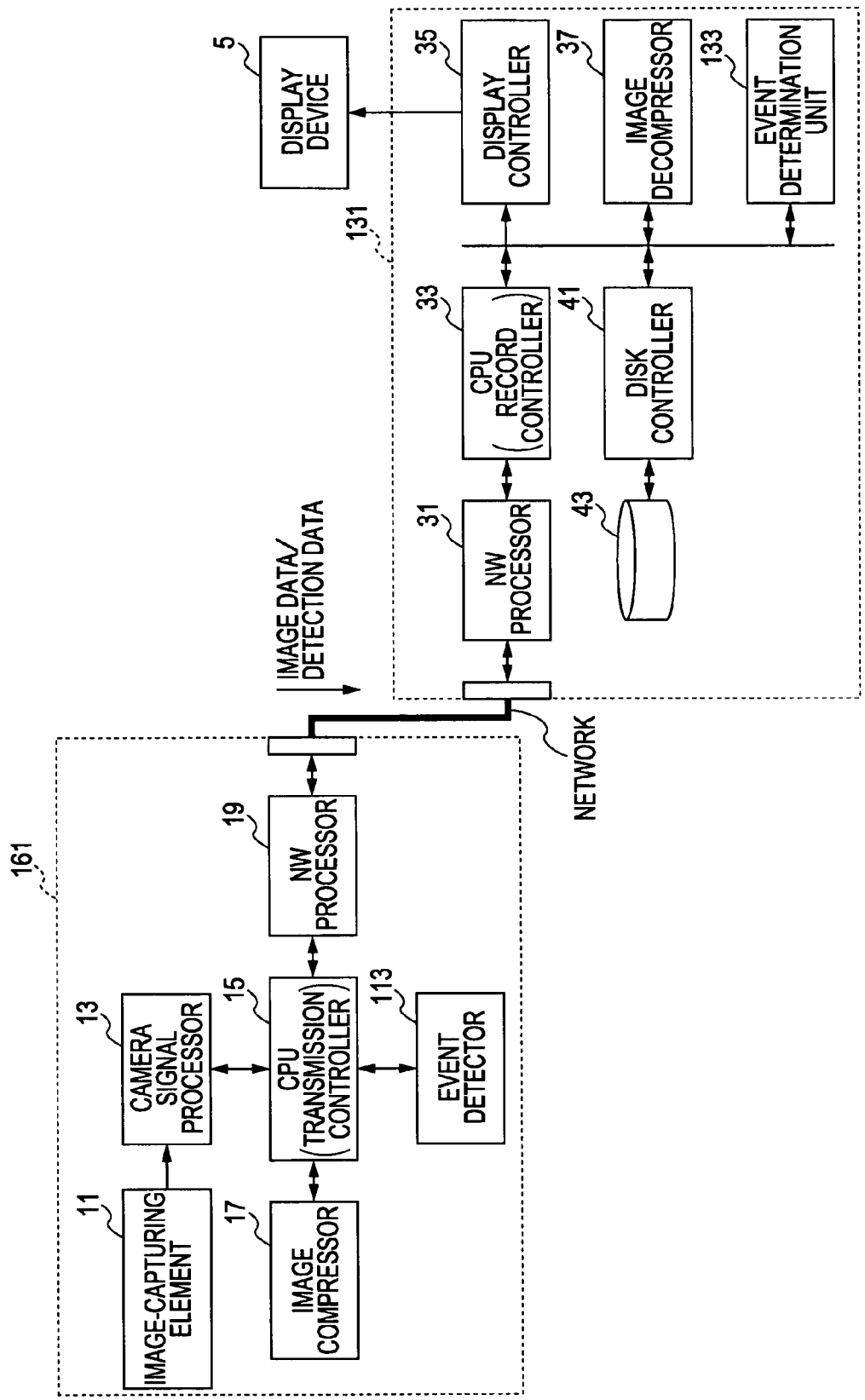
FIG. 14 shows an example of a security system according to another embodiment of the present invention.

FIG. 14 shows an example of the configuration of a monitoring system of this type. In FIG. 14, parts corresponding to parts in FIG. 7 are referred to with the same reference numerals.

In the monitoring system shown in FIG. 14, the image-processing apparatus 161 including the image-capturing element 11 performs a process for detecting a monitor event, and transmits a processing result to the management apparatus 131 via the network. In this case, advantages similar to those in the foregoing embodiments can be achieved.

Although a case where intrusion of a moving body is detected as a monitor event is described in the foregoing embodiments, the monitor event does not necessarily indicate intrusion of a moving body.

For example, the present invention can also be applied to a case where intrusion or installation of a non-moving body into a set area is detected as a monitor event.

Figure 15:
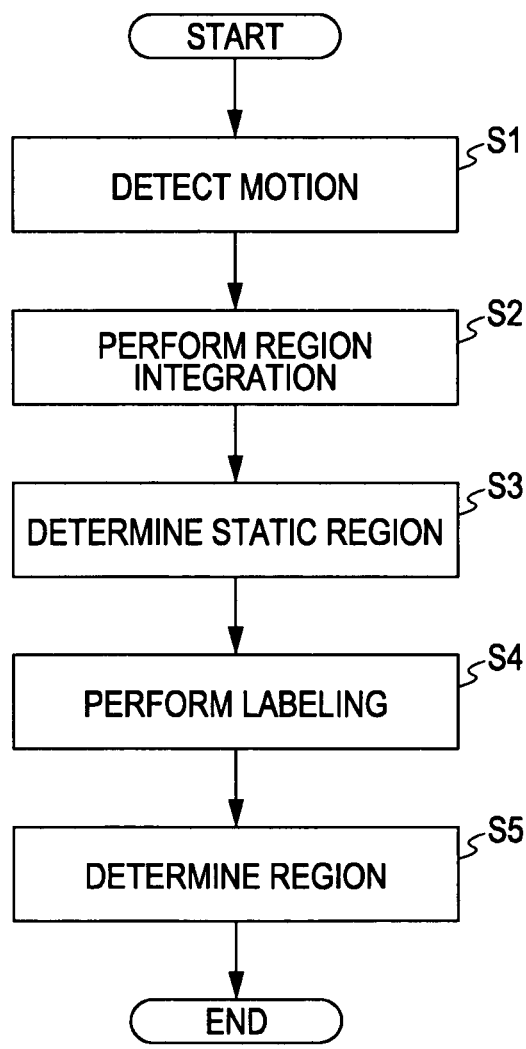
FIG. 15 shows an example of processing steps when intrusion or installation of a non-moving body is detected.

FIG. 15 shows an example of a process performed by the event detector 113 for detecting a non-moving body. In this case, the event detector 113 performs processing for detecting motion (step S1), processing for performing region integration (step S2), processing for determining a static region (step S3), processing for performing labeling (step S4), and processing for determining a region (step S5).

The processing steps other than the processing step of determining a static region can be realized by processing steps similar to those for the moving body detection process. In the processing for determining a static region, it is determined whether or not a region that is identified as a moving body at a point in time is kept stationary at a position for a predetermined period of time. Labeling is performed only on a region whose static state is confirmed, and detection is not performed on a region whose static state is not confirmed.

FIGS. 16A to 16E show processing results corresponding to screens on which captured images of a vehicle traversing the screen are displayed. The vehicle is detected as a moving body at a point in time when the vehicle intrudes into an image capture range, and the vehicle traverses the screen. Thus, the vehicle is not detected as a non-moving body.

FIGS. 17A to 17E show processing results corresponding to screens on which captured images of a vehicle stopping or parking in the screen are displayed.

At a point in time when the vehicle intrudes into an image capture range, the vehicle is detected as a moving body. Then, after the vehicle stops moving and stands still at a place in the screen, the vehicle is detected as a non-moving body.

The processing results shown in FIGS. 17A to 17E indicate the sizes S, coordinates (x,y), and times t of integrated regions.

A case where the event detector 113 performs the entire detection process is described in the foregoing embodiments. That is, a case where, in a moving body detection process, all the motion detection processing (FIG. 8B), the region integration processing (FIG. 8C), the labeling processing (FIG. 8D), and the region determination processing (FIG. 8E) are executed in the event detector 113 is described in the foregoing embodiments.

However, a procedure in which the event detector 113 performs only some of processing functions of the processing algorithms and in which the management apparatus 131 (the event determination unit 133) performs the other processing functions can be adopted. For example, the event detector 113 may perform processes until the region integration processing and may transmit the processing results to the management apparatus 131 via the network, and the management apparatus 131 may perform the labeling processing and the region determination processing. In this case, the occupied bandwidth can be significantly reduced compared with a case where a captured image is distributed on the network.

In addition, since a large load is not necessary for the labeling processing and the region determination processing, many image-capturing cameras can be managed by a management apparatus without any trouble.

In this case, a procedure in which the management apparatus instructs the image-capturing apparatus to transmit a captured image in accordance with detection of a monitor event can be adopted.

The event detector 113 may autonomously determine transmission of a captured image within a range determined from a result of processing performed by the event detector 113.

Descriptions are mostly focused on a security system in the foregoing embodiments.

However, the present invention can also be applied to an industrial camera system, a video convention system, a remote camera system (for talks, lectures, and other educational subjects, chamber photography, and event photography), and other monitoring systems as long as the system is used for recording a captured image and for sending out an alert only when a particular monitor event is detected.

Although a case where a process for detecting a monitor event is realized in terms of hardware is described in the foregoing embodiments, such a process can be realized as software processing. In this case, a program may be distributed via a network or distributed by being stored on a storage medium. The storage medium used for distribution may be a magnetic storage medium, an optical storage medium, a semiconductor storage medium, or the like.

Various modifications can be made to the present invention without departing from the scope of the present invention. In addition, various modifications and applications can be created or combined in accordance with the descriptions in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. A monitoring system comprising:
    a plurality of image-capturing apparatuses each including an event detector that executes on a corresponding captured image only some of a plurality of processing algorithms about a monitor event including region integration processing, and a transmission controller (a) that outputs to a network only a processing result of at least size of each integrated region for each moving body from the region integration processing of the executed processing algorithms without outputting the captured image when the monitor event is not determined by a management apparatus and (b) that outputs to the network the captured image for recording by the management apparatus only when an instruction to transmit the captured image is received from the management apparatus; and
    the management apparatus managing the plurality of image-capturing apparatuses via the network and including (1) an event determination unit that (a) determines occurrence of the monitor event in accordance with the received region integration processing results, (b) instructs the image capturing apparatus to transmit the captured image for recording only when the monitor event is determined to occur and (c) performs remaining processing algorithms of the plurality of processing algorithms on the received captured image and (2) a record controller that records the received captured image.

2. The monitoring system according to claim 1, wherein the monitor event indicates intrusion of a moving body into a set area.

3. The monitoring system according to claim 1, wherein the monitor event indicates intrusion or installation of a nonmoving body into a set area.

4. A monitoring system comprising:
a plurality of image-capturing apparatuses;
a plurality of image-processing apparatuses each including an event detector that executes on a corresponding captured image only part of a plurality of processing algorithms about a monitor event including region integration processing, and a transmission controller (a) that outputs to a network only a processing result of at least size of each integrated region for each moving body from the region integration processing of the executed processing algorithms without outputting the captured image when the monitor event is not determined by a management apparatus and (b) that outputs to the network the captured image for recording by the management apparatus only when an instruction to transmit the captured image is received from the management apparatus; and
the management apparatus managing the plurality of image-processing apparatuses via the network and including (1) an event determination unit that (a) determines occurrence of the monitor event in accordance with the received region integration processing results, (b) instructs the image processing apparatus to transmit the captured image for recording only when the monitor event is determined to occur and (c) performs remaining processing algorithms on the received captured image and (2) a record controller that records the received captured image.

5. The monitoring system according to claim 4, wherein each of the plurality of image-processing apparatuses includes a corresponding one of the image-capturing apparatuses.

6. The monitoring system according to claim 4, wherein each of the plurality of image-processing apparatuses is externally connected to a corresponding one of the image capturing apparatuses.

7. An image-processing apparatus comprising:
an event detector that executes on a corresponding captured image only some of a plurality of processing algorithms about a monitor event, wherein some of the plurality of processing algorithm include at least a processing result of at least size of each integrated region for each moving body from region integration processing in the captured image; and
a transmission controller (a) that outputs to a network only the region integration processing result of the executed processing algorithms without outputting the captured image when the monitor event is not determined by an external device and (h) that outputs to the network at least the captured image for recording by the external device only when an instruction to transmit the captured image is received from the external device.

8. A management apparatus comprising:
an event determination unit that (a) receives only processing result of at least size of each integrated region for each moving body from region integration processing of some of a plurality of processing algorithms via a network without receiving captured image from an external device, (b) determines occurrence of a monitor event in accordance with the received region integration processing result, (c) instructs the external device to transmit the captured image for recording only when the monitor event is determined to occur, (d) receives the captured image only after the external device receives the instruction to transmit the captured image for recording and (e) performs remaining processing of the plurality of the algorithms on the received captured image; and
a record controller that records the captured image received after the external device is instructed to send the captured image based upon occurrence of the monitor event.

9. An event detecting method for use in a monitoring system including a plurality of image-capturing apparatuses and a management apparatus managing the plurality of image-capturing apparatuses via a network, the method comprising the steps of:
executing, by each of the plurality of image-capturing apparatuses, on a corresponding captured image only some of a plurality of processing algorithms about a monitor event;
outputting, by each of the plurality of image-capturing apparatuses, to the network only processing results of at least size of each integrated region for each moving body from region integration processing of the executed processing algorithms without outputting the captured image when the monitor event is not determined by the management apparatus;
determining, by the management apparatus, occurrence of the monitor event in accordance with the received region integration processing result;
instructing a respective image-capturing apparatus to transmit the captured image for recording by the management apparatus only when the monitor event is determined to occur;
outputting, by each respective image-capturing apparatus to the network, the captured image for recording by the management apparatus only when the instruction to transmit the captured image is received by the respective image-capturing apparatus;
performing remaining processing algorithms on the received captured image; and
recording, by the management apparatus, the received captured image.

10. An event detecting method for use in a monitoring system including a plurality of image-capturing apparatuses, a plurality of image-processing apparatuses, and a management apparatus managing the plurality of image-capturing apparatuses and the plurality of image-processing apparatuses via a network, the method comprising the steps of:
executing, by each of the plurality of image-processing apparatuses, on a corresponding captured image, only some of a plurality of processing algorithms about a monitor event;
outputting, by each of the plurality of image-processing apparatuses, to the network only processing results of at least size of each integrated region for each moving body front region integration processing of the executed processing algorithms without outputting the captured image when the monitor event is not determined by the management apparatus;

determining, by management apparatus, occurrence of a monitor event in accordance with the received region integration processing results;

instructing the image-processing apparatus to transmit the captured image for recording by the management apparatus only after the monitor event is determined to occur by the management apparatus;

outputting, by each respective mage-processing apparatus to the network, the captured image for recording by the management apparatus only when an instruction to transmit the captured image is received by the respective image-processing apparatus;

performing remaining processing algorithms on the received captured image by the management apparatus, and recording, by the management apparatus, the received captured image.

11. An event detecting method comprising the steps of:

causing a computer to execute on a corresponding captured image some of a plurality of processing algorithms about a monitor event;

causing the computer to output to a network only processing results of at least size of each integrated region for each moving body from region integration processing of the executed processing algorithms without outputting a captured image when the monitor event is not determined to occur by an external device; and causing the computer to output to the network at least the captured image for recording by the external device only when an instruction to transmit the captured image for recording by the external device is received from the external device.

12. A program embodied on a non-transitory computer-readable medium causing a computer to execute processing comprising the steps of:

receiving only processing results of at least size of each integrated region for each moving both from region integration processing of a plurality of processing algorithms about a monitor event via a network without receiving a captured image from an external device;

determining occurrence of a monitor event in accordance with only the received region integration processing result;

instructing the external device to transmit the captured image for recording only when the monitor event is determined to occur;

receiving the captured image only when the external device receives the instruction to transmit the captured image for recording;

performing processing of remaining processing algorithms on the received captured image; and recording the captured image received after the external device is instructed based upon the occurrence of the monitor event.

* * * * *